Sept. 4, 1951 A. BENJAMIN 2,567,095
PORTABLE TOOL
Filed Sept. 19, 1945 2 Sheets-Sheet 1
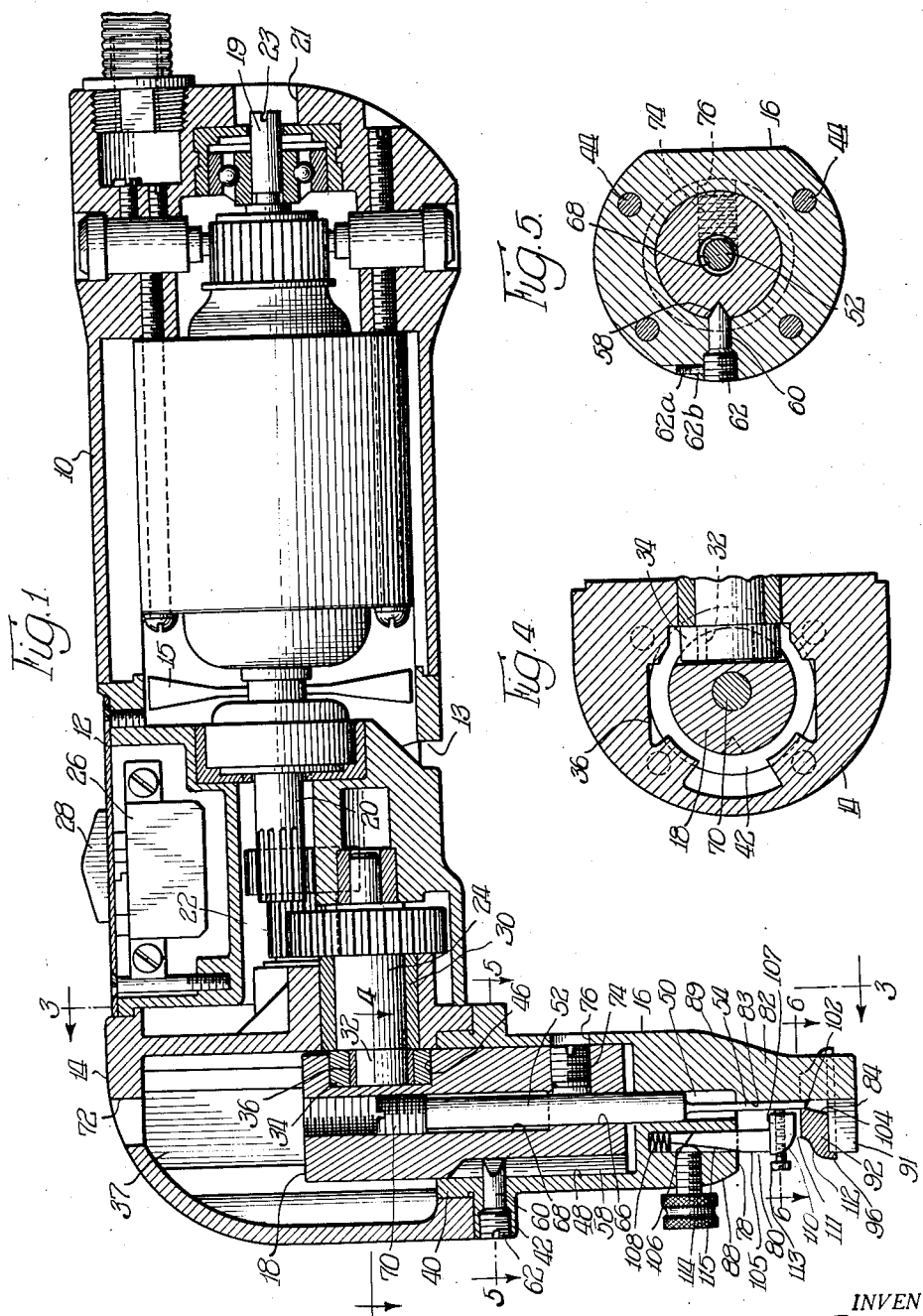
INVENTOR.
Allen Benjamin Sept. 4, 1951 A. BENJAMIN 2,567,095
PORTABLE TOOL
Filed Sept. 19, 1945 2 Sheets-Sheet 2
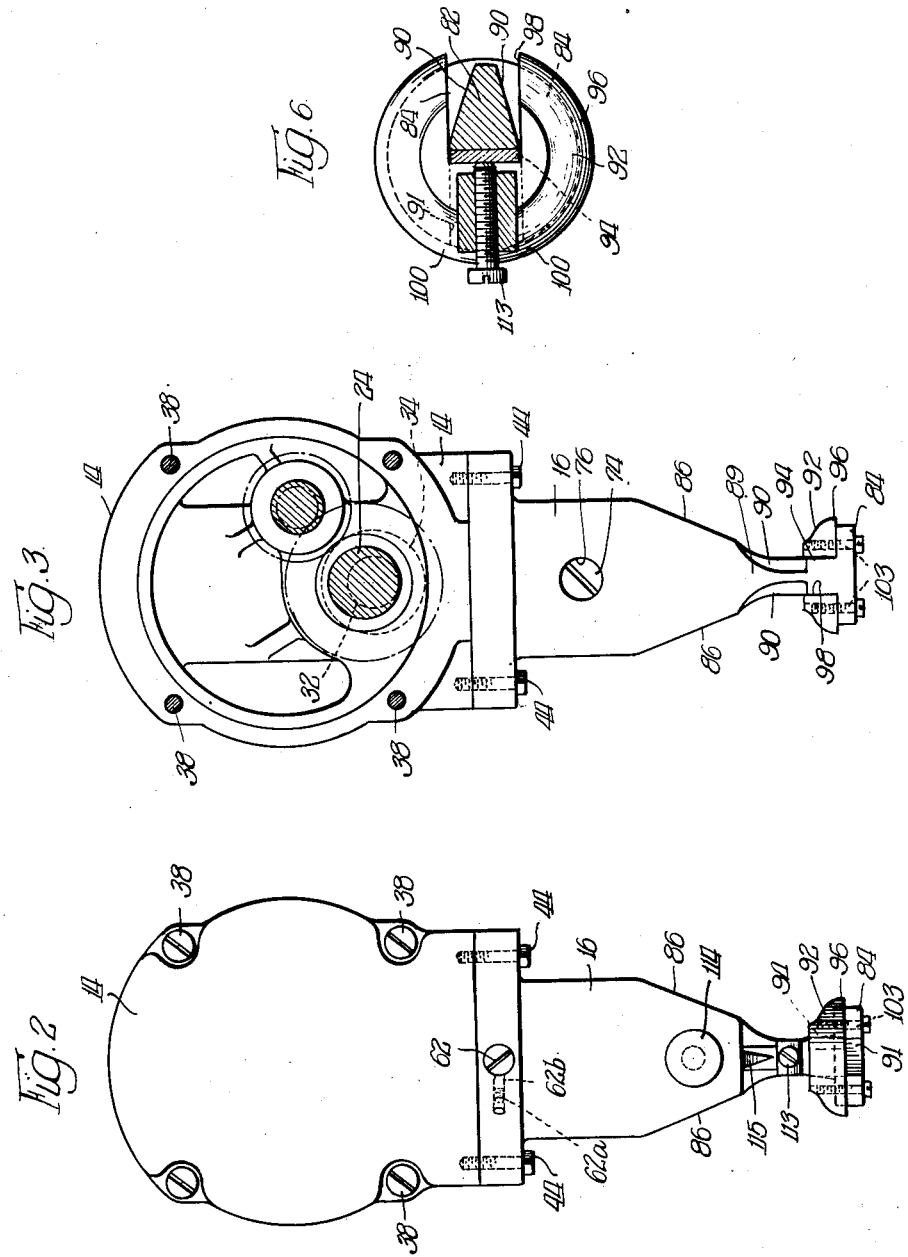
INVENTOR.
Allen Benjamin Patented Sept. 4, 1951

2,567,095

UNITED STATES PATENT OFFICE 2,567,095

PORTABLE TOOL

Allen Benjamin, Chicago, Ill., assignor to Skilsaw, Inc., Chicago, Ill., a corporation of Delaware Application September 19, 1945, Serial No. 617,191

5 Claims. (Cl. 30—241)

The present invention relates to certain improvements in a power operated hand held portable tool more particularly of the nibbler type for cutting sheet-like material.

Heretofore nibbler machines of the stationary type have been marketed wherein a metal sheet to be cut is carried to the machine and cut by the particular punching action of these machines that results in the formation of a slot in the material as small chips of metal are cut or punched away. These are heavy machines for heavy gauge production work. Portable nibblers that may be taken to the work have also been marketed but have been limited in effectiveness to relatively light gauge metal sheets and have not been considered as production tools.

One object of the present invention is to provide a tool that will have the advantages of the ruggedness and productivity of a stationary tool while also being portable and light enough in weight to be carried to the work and to be held and supported by the operator's hand during its operation.

Another object is to provide a novel means of preventing the reciprocating punch ram from rotating on its axis.

Yet another object is to provide a novel work stripper easily adjustable for different gauges of metal and for supporting and grinding the punch.

A further object is to provide a die and punch supporting column that is strong but designed for a clear view of the work by the operator and permitting a relatively sharp turn of the tool in the work being cut.

A still further object is to provide an improved die for the punch that may easily be assembled by unskilled labor in proper alignment with the punch, and an improved punch more easily assembled and regulated without damage to the tool.

Other objects will appear hereinafter and become apparent to those skilled in the art from an understanding of the following description and a review of the accompanying drawings wherein a structure embodying one form of the invention is set forth and explained for purposes of exemplification.

In the drawings:

Fig. 1 is a view in section showing a side elevation of a tool embodying the invention.

Fig. 2 is a view in front elevation of the tool.

Fig. 3 is a view taken on line 3—3 of Fig. 1.

Fig. 4 is a view taken on line 4—4 of Fig. 1.

Fig. 5 is a view taken on line 5—5 of Fig. 1.

Fig. 6 is a view taken on line 6—6 of Fig. 1.

The invention herein is exemplified in a hand held portable electric tool of the nibbler type, which, for ease of operation, maneuverability, lightness and compactness discloses the motor and gear housings as forming the handle for the tool. To the gear train there is operatively attached a reciprocating drive for a punch. The latter operates in combination with a die member to cut a path through the metal or other material and cooperating improved structure and mechanism are incorporated to bring about the desired results.

The reciprocating member or ram holding the punch heretofore has been the object of costly machining operations to interfit it with its housing to prevent rotation of the member relative to its axis. These have been machined in a rectangular or semi-rectangular formation with necessary extra time, operations and expense. A simplified slot and guide member arrangement, adjustable if desired, permits many of these operations to be dropped.

A die support is attached to the front housing and acts in part as a guide for the reciprocating member and its punch in relation to the die member thus forming a work operative head. To provide a proper view of the work being performed, this die support is shown as formed with downwardly converging portions that may be formed at least in part of what might be best defined as strength-blended radii or fillets converging to the width of its punch supporting position adjacent the work to provide maximum view compatible with maximum strength. Likewise the supporting column may converge rearwardly from its support of the punch on blended radii to provide maximum turning ability for the tool or operative head in the slot being cut.

Strippers in the past have had to be manually adjusted to various gauges of metal or other sheet material to be cut. In the present invention the stripper, through resilient means, may yieldingly adjust itself to various thicknesses of material and may be secured in the adjusted position easily and simply. In addition it may be so formed that in combination with the die, it may serve to guide a work piece to the punch and die.

The die in nibblers heretofore has furnished difficulty in assembly. It must be accurately positioned to receive the punch and if not so positioned the punch may be broken or chipped and the die ruined very quickly. The present invention provides a die that may be asembled in mass production without the services of a trained mechanic and will be accurately aligned to receive the punch. Furthermore the die and its support are so designed that chips cut by the punch may fall or be forced away from the die without accumulating and jamming the cutting operation.

With reference to Fig. 1 of the drawings it may be seen that in this embodiment the tool comprises a motor housing 10, a gear housing 12 and a front or ram housing 14. The first two form a handle for the tool by which the same may be supported in a hand during operation. At the lower end of the front housing 14, is mounted a tubular supporting column 16 or die support, for the reciprocating punch ram 18 and the punch and die assembly to be described.

Where the tool is to be powered by a fractional horse-power electric motor as shown, the armature may be formed with an elongated drive shaft member 20 that extends substantially centrally into the gear housing 12 and has a spindle portion formed on its end. As shown, a gear train generally designated as 22 is mounted in gear housing 12 and has its major portion positioned substantially below the spindle. This gear train terminates in a driven shaft 24 mounted in a suitable bearing 30 in a portion of the frame of the front housing 14. The gear train is preferably so mounted that a switch member 26 having a trigger 28 for the motor may be mounted thereabove within the gear housing 12 for protection against knocking and damage from outside sources and so that the gear and motor housings may be formed into a relatively aligned, smooth, continuous and comfortable hand grip of convenient size with a maximum of motor power since the motor may, so far as practicable, completely fill the motor housing.

The driven member 24 may have formed integrally therewith an eccentric member 32 which in turn has a roller member 34 rotatably mounted thereon through a suitable bearing 36. The eccentric and its roller extends into the front housing 14.

For convenience as may be seen from Fig. 2, the front housing 14 may be mounted to the aligned gear and motor housings by four elongated bolts 38 that extend through the front and gear housings and are threaded into complimentary threaded receiving sockets (not shown) in the motor housing. Other assembly methods may be used of course.

As shown in the drawings (Figs 1 and 2) the lower end of the front housing 14 is formed with a circular opening to receive therein an annular extension 40 of the tubular member or supporting column 16. A flange or collar 42 extends outwardly from the member 16 below the front housing opening and bolts 44, extend through the flange into the wall of housing 14 to hold the supporting column thereto in asembled relation. The tubular supporting column has a tubular bearing portion 48 forming a portion of a ram chamber 37 formed from the alignment of the front housing with the die support 16. The bearing portion is open at its bottom to provide a guide bore 50 for the punch member 52 and the supporting column extends downwardly below the operating blade 54 of the punch 52 to form a die supporting foot.

In the ram chamber 37 formed in and from front housing 14 and the bearing chamber 48 is reciprocally mounted a punch ram member 18 which may be formed from a solid cylinder, slotted as at 46 to form a cross head in which to receive the roller member 34 in a rolling but not loose fit. When the driven member 24 is rotated, eccentric 32 and its roller member 34 will rapidly raise and lower punch ram 18 in the bearing chamber 48 as the roller 34 rolls back and forth in slot or crosshead 46.

Various means may be used to prevent the punch ram 18 from rotating on its axis during its reciprocation. One seemingly simple but effective and inexpensive means (Figs. 1 and 5) is to form a V-shaped slot 58 in the surface of punch ram 18 and axially there along. An opening may then be formed through collar 42 radially from the slot 58 and a pin 60 having a wedge-shaped forward end complemental to slot 58 is mounted to ride in the latter and to permit longitudinal reciprocation of ram member 18 while holding the ram against rotation. A screw plug 62 may be inserted behind pin 60 to hold it extended in operative position. Clamping means for plub 62 may be provided by inserting a further opening in collar 42 at right angles to the screw plug opening and inserting a screw threaded member 62—a and plug 62—b to hold screw plug 62 in place.

Punch ram 18 preferably contains a centrally located bore 68 in axial alignment with guide bore 50. The lower portion of bore 68, as at 66, is of the same size as its aligned bore 50 in the tubular column 16 to receive the main body of the punch 52 in a close but sliding fit. The remainer of bore 68 is slightly enlarged and is threaded to receiver a regulating screw threaded plug 70. By tightening or loosening the plug 70 the operating blade 54 of the punch may be adjusted on assembly as to the amount protruding from the ram with respect to the die. The punch may be further regulated when necessary as the front housing is apertured at 72 for easy access to plug 70 without tearing the tool down for adjustment. The ram 18 is likewise apertured and threaded radially of the bore portion 66 to receive a threaded set screw 74 to hold the punch 52 securely within the bore so that it will positively reciprocate with ram 18. For assembly and regulation purposes the tubular member 16 is likewise apertured as at 76 so that the set screw 74 may be adjusted at will without dismantling.

There are times when punch 54 must be adjusted with respect to its die 92 such as on original assembly and after the punch has become dull or worn and been resharpened. For this purpose it is necessary to turn the armature shaft 20 to bring punch ram 18 to its lowest position and to insert punch 54 within the ram far enough so that the punch blade end will pass below the cutting edge of die 92 a distance sufficient to make a proper cut but to clear the die sufficiently at the top of its stroke to permit the insertion of the material to be cut. Plugs 70 and 74 are then screwed in to hold the punch securely in this regulated position.

In the past, the armature has been turned by inserting a screw driver or other implement through air slots 13 in the housing 12 to rotate the armature shaft fan 15 blade by blade. This is tedious and slow and apt to damage the blades. This difficulty has been overcome by means of elongating the armature shaft 19 beyond its rear bearing seat so that it extends into an appropriate opening 21 in the motor housing. By slotting or adding a kerf 23 or other interlocking means on this end of the armature shaft, a screw driver or other proper tool may be used to turn the armature shaft manually to bring ram 18 to its lowest point and also to bring set screw 74 into alignment with the adjusting opening 76 without damage or injury to any of the parts.

The tubular punch and die supporting column 16 contains the guide bore 50 as explained to form a guide and bearing for main punch body portion 52. This column ends or is cut off abruptly as at 78 in front of the blade 54 to form one wall of a work ingress opening 80. Behind the blade 54 the column 16 is continued downwardly into a leg portion 82 and forwardly beneath the end of the punch blade into a foot or die supporting portion 84. The leg 82 is constructed to form a guide and support portion 83 for the blade 54 throughout a substantial portion of its length during its reciprocation and to assist in preventing buckling or breakage of the blade.

Preferably the column 16 is sharply reduced in cross-section by converging sides 86—86 (Figs. 2 and 3) as it merges into the leg portion 82 adjacent to the work ingress opening 80 (Fig. 1). The front and rear portions may be rounded off at substantially corresponding portions as at 88 and 89 respectively. These portions 86, 86 and 88, 89 accomplish the twofold objective of permitting excellent vision by an operator of the blade 54 and the work in the opening 80, and of maintaining the column 16 as strong as possible for as great a length as possible. Opposite the opening 80 the leg 82 may be further reduced behind the blade 54 as at 90, to a width no greater than the width of the blade itself as it must follow and support the blade in the slot being cut without binding. Further it is desirable to have the leg portion adjacent the blade as wide as possible to furnish a maximum of support to the blade and to be reduced rearwardly thereof as rapidly as needed strength will permit so that the tool may be turned at a maximum angle in the slot to the right or left and so that a tortuous path may be cut through the work if desired.

To accomplish these purposes the rounded portion may be continued downwardly behind the blade to form the leg 82 to a thickness having maximum strength and maneuverability behind the working end of the blade 54 while of a width sufficient to follow the blade without binding. At its sides the leg may be cut away concavely in blended radii from the support portion 83 rearwardly and from the lower ends of the diverging sides 86 downwardly to form turning portions 90 (Figs. 3, 6) for the tool. By using curved surfaces and blended radii as shown rather than, for instance, a rabbeted formation, points of stress concentration are eliminated and a materially stronger supporting leg is provided.

The foot 84 (dotted lines, Fig. 6) may be substantially circular with a chip slot 91 cut in the forward portion beneath blade 54 so that the foot may appear somewhat U-shaped with the arms of the U pointing forwardly to permit chips cut by the blade 54 to fall freely away from the work and through the slot. The slot may preferably be of the same or slightly greater width than the blade for this purpose and to accommodate the blade on an extra long stroke if not properly adjusted.

For ease of assembly the foot may have a flat upper surface while the leg 82 adjacent to the foot has flattened parallel guide portions 94 to receive, guide and hold the die in a properly fitted and assembled relation. The die itself may be made in a circular formation with a downwardly depending skirt 96 fitting over the perimeter of the foot. The die is slotted as at 98 of a width and shape to permit the two arms 100 thus formed to fit on either side of the leg 82 and to be guided by the flattened portions 94 to a position over the foot 82 where the skirt portion 96 may be fitted snugly thereover. The slot 98 is of sufficient length so that when so fitted, the inner edge forms the die edge 102 and cooperates with the punch blade 54 to cut off a predetermined maximum size of chip from the work piece. The die need not be further adjusted when so mounted and may be held in its assembled position as by screws 103 (Fig. 2) extending through the foot into the die 92. The assembly of the die to its support, as shown, is such that both are circular in their peripheries and formed from radii extending from the axis of punch member 54. The circular flange of the die assures a proper fit over the complementary circular edge of the support.

Below the die edge 102 the die may be beveled or under-cut as at 104 (Fig. 1) to form an egress for chips cut off at the edge thus permitting them to fall through slot 91 in the foot and away from the work. By this construction the danger of piling up of chips at this point and the possibility of jamming caused thereby is eliminated.

To further guide and guard the blade 54 and to prevent the work piece from riding up with the return of the blade from a cutting stroke, an adjustable stripper 105 may be used. As shown the stripper may be formed with a tapered side or stem 115 mounted in an opening 106 in the tubular column 16 and in front of the blade 54. It extends downwardly and outwardly from the opening into the work ingress opening 80 and is formed with a toe portion 107 that extends over into contact with the front face of the blade 54 to form a guide and support to prevent the blade 54 from being pulled away from leg guide or support portion 83 of the column 16 by a work piece.

This stripper may be made longitudinally adjustable as shown by mounting a spring 108 to bear against the bottom of opening 106 and the inner end of stem 115 tending to press the stem from the opening. As so described the stripper will normally rest at its lower end on the upper surface of punch die 92. A curved heel portion or guide 110 may be formed on the stripper to act as an upper lip to guide a work piece to the punch blade while a work mouth opening 111 may be formed by a corresponding lower lip 112 on the punch die 92. Thus a work piece will be guided to the blade and the stripper yieldingly pressed inwardly against spring 108 an amount equivalent to the width or gauge of the work piece. A set screw 114, through a suitable opening in column 16 leading to opening 106 then may be tightened against the tapered stem 105 to positively prevent further inward movement of the stripper.

By merely loosening the thumb screw 114, inserting a work piece betwen the guide lips 110, 112 and tightening the screw 114, an operator has secured an automatic adjustment of the stripper and the work piece mouth opening 111 without using a gauge or his fingers to pull or push the stripper into proper position. The stripper thus forms a guard for the blade and for the operator's fingers that might otherwise possibly and accidentally be cut thereby.

The stripper insofar as it guides and supports the blade 54 may also be made adjustable to account for any tolerance in assembly or machining and so the operator may be certain that the blade is properly supported. As shown this may be accomplished by providing a threaded opening through the toe portion 107 of the stripper and inserting a correspondingly threaded screw 113 through the opening that may be tightened against the front of blade 54 and in effect form an adjustable inner end or front guide portion for the stripper.

While the invention is exemplified in relation to one embodiment, various modifications within its scope will be apparent to those skilled in the art from this disclosure.

I claim:

1. In a motor operated hand-held cutting tool, the combination with a cylindrical housing, of a reciprocable cylindrical member mounted in said housing, a punch member carried by said cylindrical member, operative connections between said motor and said cylindrical member, means for preventing rotation of said cylindrical member during the reciprocation thereof, a die member for cooperation with said punch, a stripper member slidably mounted in a vertical bore formed in the lower end of the housing to permit vertical adjustment of said stripper member, adjustable means extending transversely into said bore for engaging and holding said stripper against inward movement after adjustment, and means carried by the lower end of said stripper for adjustment toward and away from the lower end of said punch for maintaining the punch in proper alignment with said die member.

2. In a motor operated hand-held cutting tool, the combination with a cylindrical housing, of a reciprocable cylindrical member mounted in said housing, a punch member carried by said cylindrical member, operative connections between said motor and said cylindrical member, means for preventing rotation of said cylindrical member during the reciprocation thereof, a die member for cooperation with said punch, a stripper member slidably mounted in a vertical bore formed in the lower end of the housing, one side of the upper portion of said stripper being tapered, adjustable means for engaging said tapered side for wedgingly holding said stripper against inward movement after adjustment, and means carried by the lower end of said stripper for adjustment toward and away from the lower end of said punch for maintaining the punch in proper alignment with said die member.

3. In a motor operated hand-held cutting tool, the combination with a cylindrical housing, of a reciprocable cylindrical member mounted in said housing, a punch member carried by said cylindrical member, operative connections between said motor and said cylindrical member, means for preventing rotation of said cylindrical member during the reciprocation thereof, a die member for cooperation with said punch, a stripper member slidably mounted in a vertical bore formed in the lower end of the housing, one side of the upper portion of said stripper being tapered, spring means for continuously urging said stripper towards said die member and work piece in proper adjustment, adjustable means for engaging said tapered side for wedgingly holding said stripper against inward movement after adjustment, and means carried by the lower end of said stripper for adjustment toward and away from the lower end of said punch for maintaining the punch in proper alignment with said die member.

4. In a motor operated hand-held cutting tool, the combination with a cylindrical housing, of a reciprocable member mounted in said housing, a punch member carried by said member, operative connections between said motor and member, a substantially round die supporting platform carried by a substantially reduced leg portion forming the lower end of said housing, said platform extending outwardly at right angles to three adjacent sides of said leg portion, and a correspondingly rounded die member positioned and supported on said platform, said die member being provided with a cut-out portion adapted to straddle the platform supporting leg when in operative position with respect to the punch.

5. In a motor operated hand-held cutting tool, the combination with a housing, of a reciprocable member mounted in said housing, a punch member carried by said member, operative connections between said motor and member, a substantially round die supporting platform carried by a substantially reduced leg portion forming the lower end of said housing, said platform extending outwardly at right angles to three adjacent sides of said leg portion, and a correspondingly rounded die member positioned and supported on said platform, said die member being provided with a cut-out portion adapted to straddle the platform supporting leg and also a bottom recess providing a downwardly extending peripheral flange adapted to closely engage the outer edge of said platform to ensure the proper operated position of said die member with respect to the punch, and means for securing said die member in said position.

ALLEN BENJAMIN.

REFERENCES CITED

The following references are of record in the file of this patent:

UNITED STATES PATENTS

| Number | Name | Date |
|---|---|---|
| 31,681 | Sprague | Mar. 12, 1861 |
| 1,349,661 | Buhl | Aug. 17, 1920 |
| 1,897,771 | Sherman | Feb. 14, 1933 |
| 2,035,448 | Andersson | Mar. 31, 1936 |
| 2,125,556 | Gleich | Aug. 2, 1938 |
| 2,217,393 | Webb | Oct. 8, 1940 |
| 2,278,174 | Gray | Mar. 31, 1942 |
| 2,278,311 | Gray | Mar. 31, 1942 |
| 2,318,982 | Wilhide | May 11, 1943 |
| 2,376,590 | Forss | May 22, 1945 |